Dec. 13, 1960 D. A. STARR, JR 2,963,777
METHODS OF MAKING MAGNETIC TRANSDUCING MEANS
Original Filed March 11, 1953

*INVENTOR.*
DAVID A. STARR JR.
BY *Laurence R. Brown*
ATTORNEY

United States Patent Office 2,963,777
Patented Dec. 13, 1960

2,963,777

METHODS OF MAKING MAGNETIC TRANS-
DUCING MEANS

David A. Starr, Jr., Berwyn, Pa., assignor to Burroughs Corporation, Detroit, Mich., a corporation of Michigan Original application Mar. 11, 1953, Ser. No. 341,735, now Patent No. 2,879,340, dated Mar. 24, 1959. Divided and this application Aug. 14, 1956, Ser. No. 603,995

4 Claims. (Cl. 29—155.57)

This is a division of the copending application of David A. Starr, Jr., for Magnetic Transducing Means, filed March 11, 1953, S.N. 341,735, now Patent No. 2,879,340, issued March 24, 1959. The present invention relates generally to magnetic recording and reproducing devices and techniques, and more particularly to transducers and their manufacture.

In magnetic recording or reproducing systems it has been difficult to obtain uniformity of transducer characteristics with gap type heads, since leakage flux and transducing flux distribution is not uniform in identically manufactured cores because of manufacturing tolerances. In addition, residual magnetism of a transducer ferromagnetic core is undesirable since it may cause the record surface to be polarized in such a way that recorded signals are changed in amplitude. This effect is particularly pronounced when the transducing means is a gap in the transducer core since the residual leakage flux will be concentrated near the record surface.

Therefore toroidal or ring shaped transducers have been made with a single wire held about a closed loop of core material. However, it has been difficult to hold the wire taut about the core to prevent it from fouling a closely spaced recording surface. Likewise a problem has been presented in soldering a very fine wire in position about the core since the heat causes the wire to stretch out of position or break.

It is, accordingly, a general object of the present invention to provide manufacturing techniques applicable to transducer devices which improve the foregoing inadequacies of the prior art.

A further object of the invention is to provide transducing devices which lend themselves to uniformity in manufacture.

Further it is an object of the invention to provide economical methods of manufacture of magnetic transducers.

Other objects and features of advantage will be found throughout the following description of the invention.

A transformer is provided having transducing means closely wound about the core in the form of a closed winding of fine wire which may be positioned in the vicinity of a record surface. Tensioning means is placed on the inner periphery of the core to hold the wire tautly in place against the outer periphery of the core. The tensioning means comprises a metallic spring of conductive material, which is held compressed against the inner periphery of the core while the wire is soldered thereto, to serve as a thermal sink for preventing damage during soldering, and serving upon release to hold the transducing wire in place.

Details of construction and operation of the invention are explained in the ensuing specification with reference to the accompanying drawing, in which.

Figure 1:
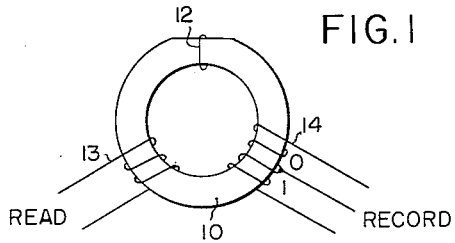
Fig. 1 is a schematic view of a transducer constructed in accordance with the principles of the invention.
Figure 2:
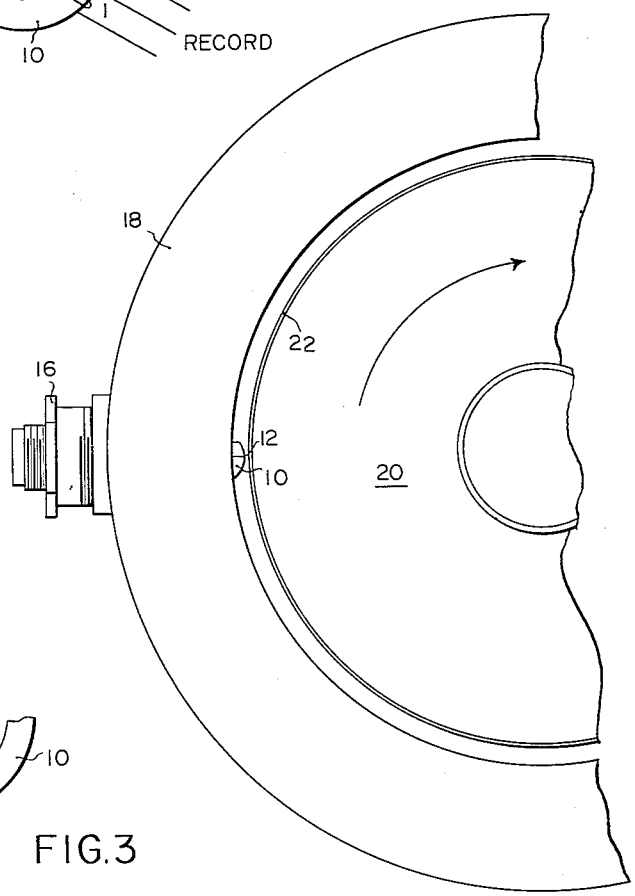
Fig. 2 is a partial elevation view, broken away in section, of a magnetic drum storage system embodying the invention.

Referring now to Figs. 1 and 2 of the drawing, a completely closed toroidal type homogeneous ferromagnetic core 10 of high magnetic permeability is shown. A single closed transducing winding comprising a shorted turn 12 of fine wire closely wound about one portion of the core 10 is provided. Auxiliary transformer windings 13 and 14 on another portion of the core are provided for connection to external electrical circuits. The ring or core 10 is mounted in a fitting 16 of the housing 18 about a rotary drum 20, or other movable member, and the ring is positioned adjacent to the surface coating 22 of ferromagnetic record material on the drum. The axis of the ring is disposed substantially parallel to the recording surface and the thin conductive band 12 of the transducer winding provides an encircling ridge in close proximity to the outer periphery of the transducing portion of core 10, which is disposed closely adjacent to the path of movement of the record surface 22. The ridge, therefore, constitutes the closest part of the core to the record surface and serves as the transducing means.

A magnetic drum storage device of this type is well adapted to store discrete digital information in a plurality of indexed tracks about the circumference of the drum. In order to provide maximum storage capacity it is desirable that the transducer record and reproduce signals of high definition so that the signal packing density is high.

With the present transducer, the fine wire transducing means 12 encircling the core 10 is particularly adapted to record a discrete digital signal in a small space and may be placed very close to the magnetic coating 22 on the drum surface. It is significant that in the core of the present transducer there is no transducing gap which might cause a concentrated residual leakage flux in the vicinity of the record surface 22. Since the core forms a closed endless loop of magnetic material unbroken throughout its extent, any external residual flux is distributed uniformly about the entire toroid.

In manufacture uniformity of the diameter of the fine wire is more easily achieved than uniformity of the width of a transducing gap in prior art heads. The transducers of this invention are therefore capable of more uniform response than prior art transducers. This is desirable in a multi-track indexed storage system since the maximum storage cell packing density is determined by the poorest head response. With more uniform construction, however, it is possible not only to define smaller storage cells but to obtain more nearly identical response from all tracks of the storage system.

Figure 3:
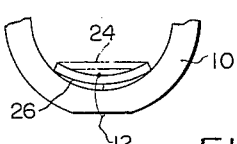
Figs. 3 and 4 are partial views of transducers incorporating further aspects of the invention.

Fig. 3 illustrates details of manufacturing a toroidal transducer with a thin silver or copper conductive wire. Since the closed turn must be soldered about the toroid, a problem is presented because the heat transferred from the soldering iron to the fine wire causes it to open or weaken. In addition, it is difficult to draw the wire tight enough to fit firmly about the head after soldering in a conventional manner. Only a tight fitting wire will provide properly oriented transducer flux. A tight fitting wire also will not sag so as to cause the spacing from the recording surface to change or the transducing wire to become broken by contact with the recording surface.

Figure 4:
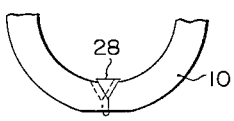

In construction of the head, therefore, a thin conductive or metallic flexible shim, resilient leaf or strand comprising a substantially planar plate 24 is formed to ride against the inner arcuate periphery of the core 10 while engaging the core surface at two separated positions. The member 24 is compressed against the core 10 to form an arcuate surface substantially conforming to the inner peripheral surface of the core. The member 24 is formed as shown in Fig. 4 or otherwise is provided with smooth or rounded longitudinal edges to prevent any sharp bending or cutting action of the wire which contacts the edges thereof. When the tensioning means is compressed it does not exert a force sufficient to exceed the elastic limit of the wire in winding 12.

The surface of the shim is preferably cleaned and tinned to provide a good soldering and heat conductive surface. The conductor 12 is then wound about the core substantially at the center of member 24 and the opposite ends are bent together and held in contact with the shim at one position for soldering thereto. During soldering, therefore, the heat is rapidly conducted away from the fine wire by the shim 24 and therefore the soldering may be accomplished without breaking or weakening the wire. After soldering the shim will flex into a semicompressed position 26 holding the transducer wire 12 tightly in place.

In order to provide the proper flux density and sharp definition at the record surface and yet keep the closed transducer winding losses at a minimum, the shorted turn may be shaped as shown in Fig. 4 to have a widened saddle section or band 28 about the inner toroidal core surface opposite the thinner band comprising the transducing surface. The winding may be tapered or otherwise shaped to provide optimum transducing flux pattern and the widened saddle section 28 may be used for the additional purpose of the shim 24 of Fig. 3, if desired.

From the foregoing description it is clear that there is provided in accordance with the teachings of this invention an improved method of making a magnetic transducer affording many advantages in connection with recording systems. Those novel features believed descriptive of the nature of the invention are therefore described with particularity in the appended claims.

What is claimed is:

1. The method of manufacturing a magnetic transducer having a closed toroidal core, comprising the steps of, forming a flexible and resilient metallic member with rounded longitudinal edges to ride upon the inner periphery of the core and engage a sector thereof at a pair of separated positions, holding the flexible member in place on the core in compressed position in substantial surface contact with the core, wrapping a single filamentary wire tightly about the outer periphery of the core in a position substantially in the center of the compressed member, conductively affixing the free ends of the wire to the compressed member, and releasing the flexible member to a partially compressed position holding the wire in taut position against the outer periphery of the core.

2. The method of manufacturing a magnetic transducer, comprising the steps of, forming a homogeneous smooth closed loop of high permeability magnetic core material, having an arcuate inner periphery portion, forming a substantially planar resilient metallic plate for riding within the inner periphery of the closed loop, placing the plate in engagement with two separated points on the arcuate inner periphery portion, compressing the plate into an arcuate position substantially conforming with the arcuate inner periphery portion of the closed loop, wrapping a fine electrical conductor about the outer periphery of the closed loop at the position occupied by the compressed plate, soldering a portion of the conductor contacting the flexed plate to the compressed plate, and releasing the plate to a partially compressed position thereby holding the wire taut to the outer periphery of the closed loop.

3. The method of manufacturing a closed core with a shorted winding comprising the steps of deforming a leaf of flexible electrically conductive material to a flexed condition toward the core at an area where the leaf is normally spaced from the core, passing a wire around a portion of the core with the ends of the wire adjacent the leaf of flexible material, and soldering the wire at the leaf with the leaf in its flexed condition to thereby both dissipate heat from the wire during soldering and to thereafter maintain the wire in tension tightly about the core.

4. A method of manufacturing a closed core with a shorted winding comprising the steps of positioning a leaf strand of flexible material on the inner periphery of the core, flexing said leaf toward the core, passing a wire around the core proximate said leaf, terminating the ends of said wire on said leaf, soldering said ends to said leaf, thereby to dissipate the heat from the wire, releasing the flexed leaf and thereby holding taut said wire around the core.

References Cited in the file of this patent

UNITED STATES PATENTS

| | | |
|---|---|---|
| 459,366 | Lundell | Sept. 8, 1891 |
| 2,561,462 | Compton et al. | July 24, 1951 |
| 2,610,387 | Borland et al. | Sept. 16, 1952 |
| 2,676,392 | Buhrendorf | Apr. 27, 1954 |
| 2,754,569 | Kornei | July 17, 1956 |